United States Patent [19]

Bryant et al.

[11] Patent Number: 5,428,561
[45] Date of Patent: Jun. 27, 1995

[54] EFFICIENT PSEUDORANDOM VALUE GENERATOR

[75] Inventors: David Bryant, Oak Park; Eugene Vendrovsky, Lake Forest, both of Calif.

[73] Assignee: Zilog, Inc., Campbell, Calif.

[21] Appl. No.: 51,639

[22] Filed: Apr. 22, 1993

[51] Int. Cl.⁶ .............................................. G06F 1/02
[52] U.S. Cl. ................................................... 364/717
[58] Field of Search .................. 364/717, 717.5, 715.09

[56] References Cited

U.S. PATENT DOCUMENTS 4,441,201 4/1984 Henderson et al. ................... 381/51
4,493,046 1/1985 Watanabe .............................. 364/717
5,258,936 11/1993 Gallup et al. ......................... 364/717

Primary Examiner—Roy N. Envall, Jr.
Assistant Examiner—Emmanuel Moise
Attorney, Agent, or Firm—Majestic, Parsons, Siebert & Hsue

[57] ABSTRACT

Pseudorandom values are produced using a memory and an arithmetic logic unit. The previous value is shifted four places to the left to form a shifted value. Next, the previous value is subtracted from this shifted value to form a subtracted value. The least significant bit of this subtracted value is complemented to form the new value.

21 Claims, 3 Drawing Sheets

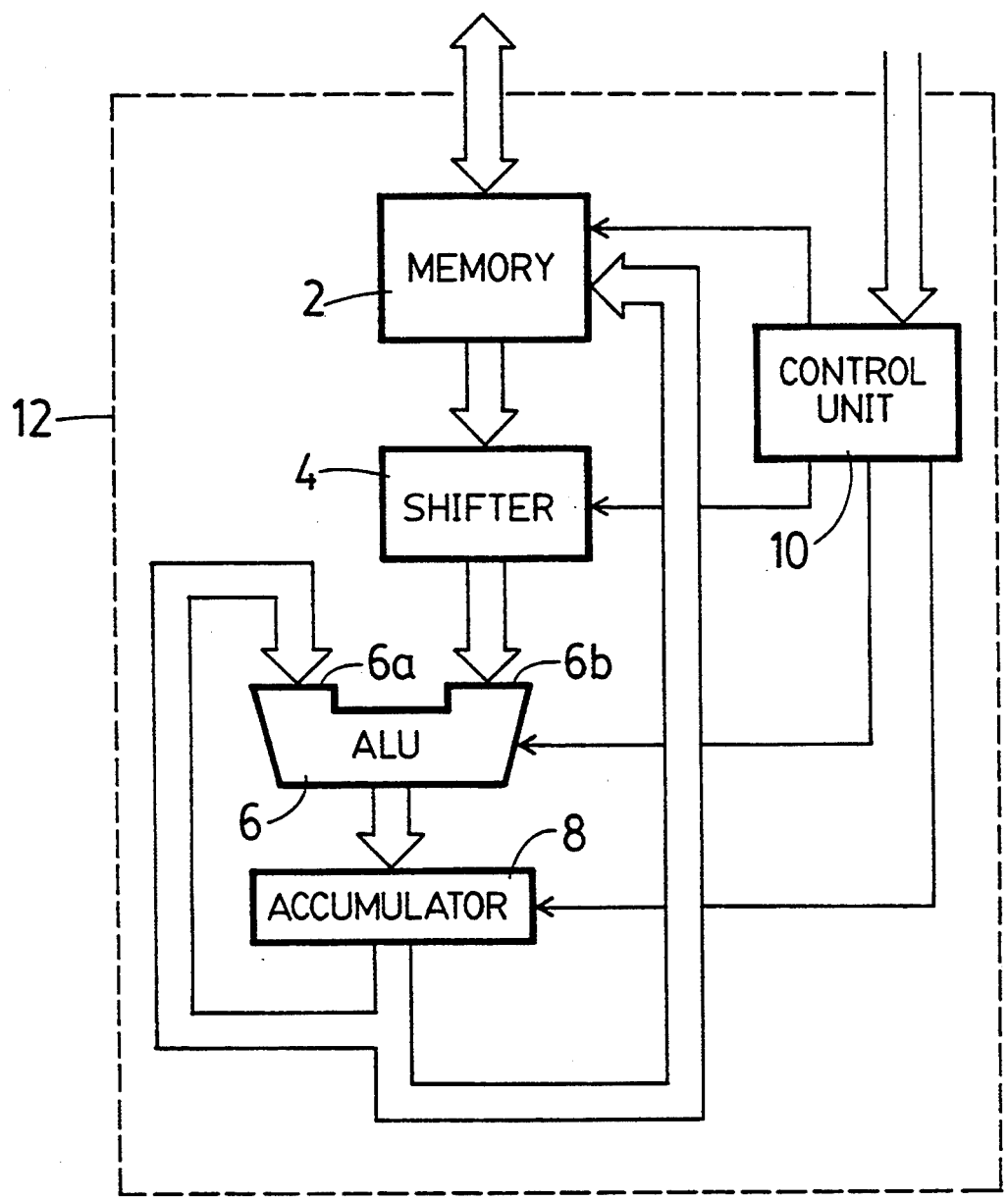
FIG._1.

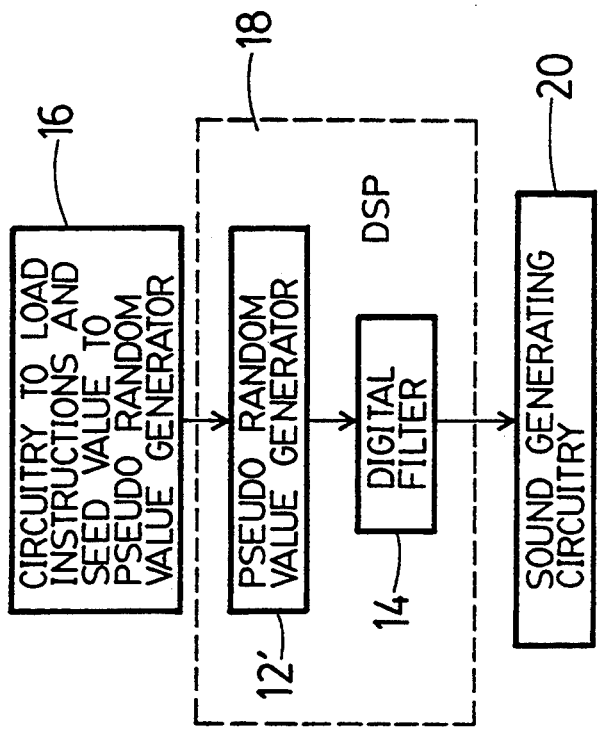
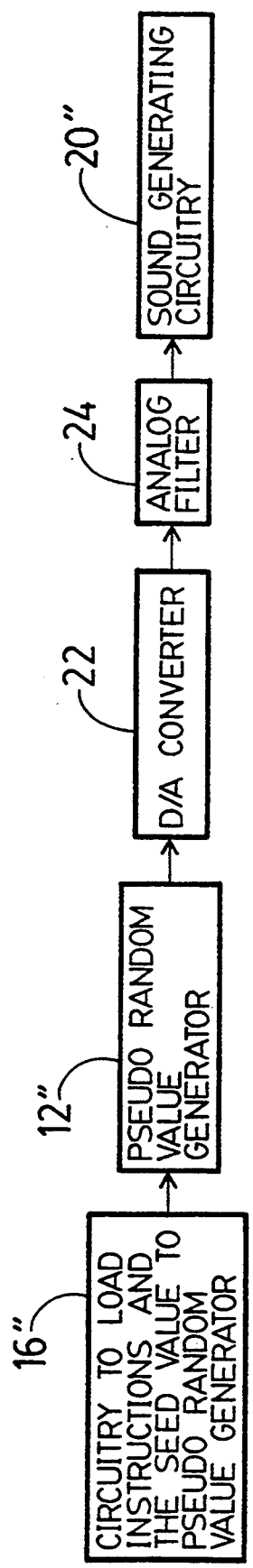

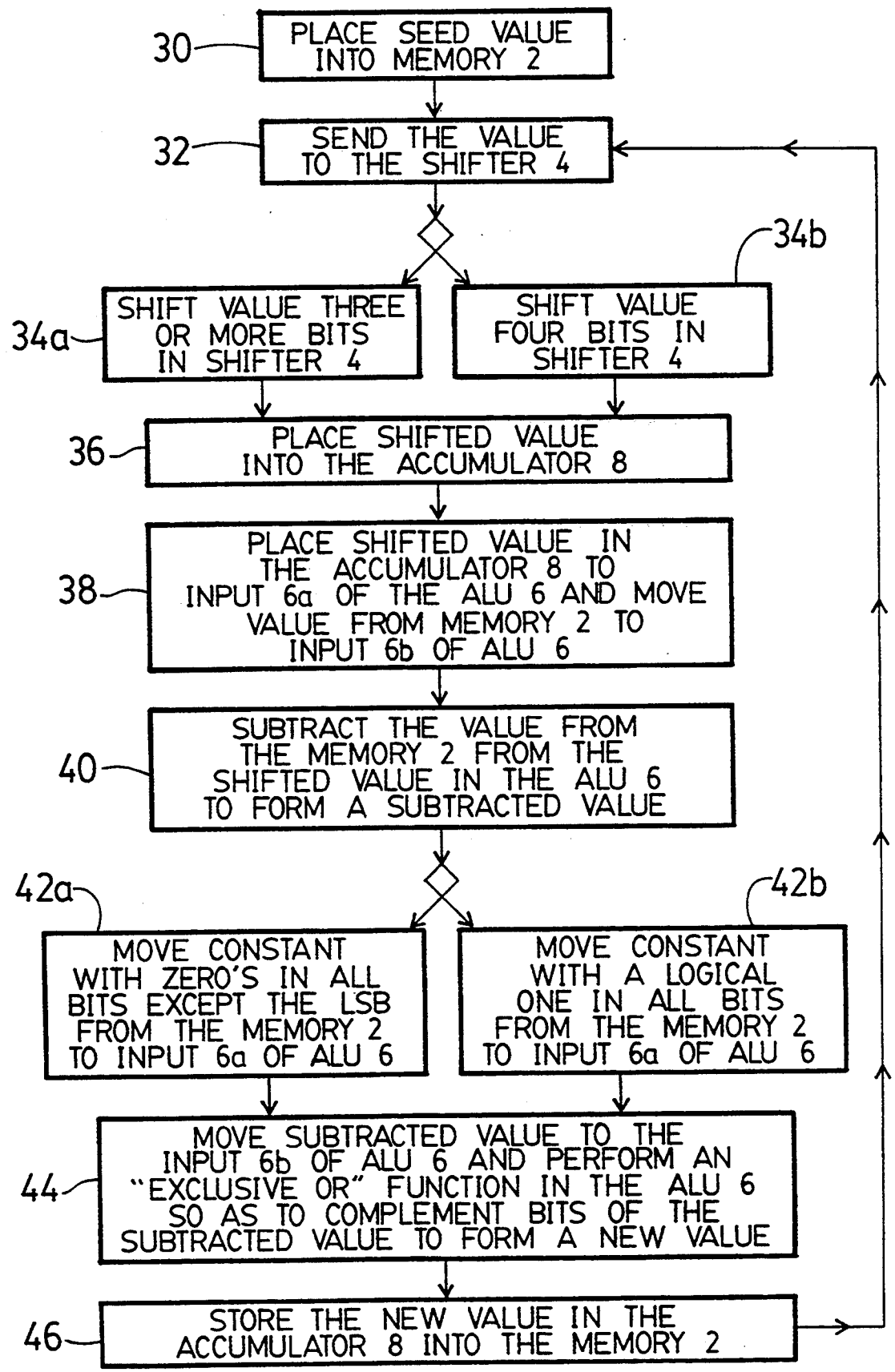
FIG._4.

EFFICIENT PSEUDORANDOM VALUE GENERATOR

BACKGROUND OF THE INVENTION

This invention relates to a method and system for generating pseudorandom values. The pseudorandom values have use in many applications such as speech generation.

A popular method used for generating sequences of pseudorandom values is a simple shift with parity derived feedback. This method works well with central processing units (CPU's) that have parity detect circuitry. In this type of pseudorandom value generator, a few bits of the previous value are used to produce a parity bit. The next value is generated by shifting the previous value and using the parity bit to provide feedback. A disadvantage of this method is that machines without parity detect must emulate a parity detect by using software instructions to produce a value comparable to the parity bit.

Another prior art pseudorandom value generator is a multiplicatively congruent pseudorandom value generator. These generators multiply the previous pseudorandom value by a constant and throw out the overflow bits. This method is computationally expensive because it requires a multiply operation.

In addition, both of the above prior art methods have forbidden seeds, or first values of the generator. For example, in the multiplicatively congruent pseudorandom value generator, the seed value cannot be a zero since zero times any constant is zero.

It is desired to have a method of producing pseudorandom values that does not have the disadvantages of these previous methods.

SUMMARY OF THE INVENTION

The present method does not have any forbidden seeds. This method works well on machines without a parity detect and the generated sequence includes all possible combinations. That is, for a 32 bit word, the pseudorandom value generator goes through all $2^{32}$ combinations.

In accordance with the principles of the present invention, the above and other objectives are realized by using a method for generating pseudorandom values in a circuit including a memory and an arithmetic logic unit. This method comprises placing a seed value into the memory; forming a shifted value from the value in memory; subtracting in the arithmetic logic unit the value in the first register from the shifted value in the second register to form a subtracted value; and, complimenting one or more bits of the subtracted value to form a new value.

Optionally, the shifted value is formed by shifting a value four bits to the left. The method will also work if the value in the second register is shifted three bits.

BRIEF DESCRIPTION OF THE DRAWINGS

The above and other features and aspects of the present invention will become more apparent upon reading the following detailed description in conjunction with the accompanying drawings, in which:

FIG. 1 is a block diagram of the digital signal processor or microcomputer used for implementing the pseudorandom value generator of the present invention;

FIG. 2 is a block diagram of an embodiment of a speech synthesis circuit using the pseudorandom value generator of the present invention;

FIG. 3 is a block diagram of an alternate embodiment of a speech synthesis circuit using the pseudorandom value generator of the present invention; and FIG. 4 is a flow chart showing the method of the present invention.

DETAILED DESCRIPTION OF THE PREFERRED EMBODIMENT

FIG. 1 is a block diagram of the digital signal processor (DSP) or microprocessor for implementing the pseudorandom value generator. A seed value is placed in the memory 2. This memory 2 is the random access memory attached to the DSP or microprocessor. The seed value is the first value of the pseudorandom value sequence. In the present invention, the seed value can be any value. There are no forbidden seed values. This seed value is moved to the shifter 4. The shifter 4 can be instructed by control unit 10 to shift the value placed through the shifter 4 a number of bits. In one embodiment, the shifter 4 can shift the value zero to fifteen bits to the left. In the present method, the seed value is shifted three or more bits to the left to form a shifted value. Logical "zeroes" are shifted into the least significant bits of the value. In the preferred embodiment, the value from the memory 2 is shifted four bits to the left in the shifter 4. The shifted value is then sent to input 6b of the arithmetic logic unit (ALU) 6. The ALU 6 does no operation on the shifted value but puts the shifted value into the accumulator 8.

In the next step, the seed value is moved from the memory 2 to the shifter 4. The shifter 4 does not shift the seed value but passes on the seed value to input 6b of the ALU 6. The value in the accumulator 8 which is the shifted value is then moved to input 6a of the ALU 6. The ALU 6 subtracts the non-shifted value at input 6b from the shifted value at input 6a to form a subtracted value. The subtracted value is stored in the accumulator 8.

Next a constant value "1" from the memory 2 is moved through the shifter 4 without any shift and then moved to input 6b of the ALU 6. The value in the accumulator, the subtracted value, is then moved back to input 6a of the ALU 6. The ALU 6 then performs an "exclusive or" (XOR) operation. The "exclusive or" operation will complement the least significant bit of the subtracted value. If a value containing ones in all the bits is "exclusive or" 'ed with the subtracted value, all the bits of the subtracted value are complimented. In some processors, complimenting all the bits of the subtracted value may be more efficient.

The accumulator 8 contains a new pseudorandom value. The value in the accumulator 8 can then be stored back into the memory 2.

This method can be repeated as many times as pseudorandom values are needed. The new pseudorandom value is shifted in the shifter 4, sent to the accumulator 8 then a subtracted value is formed. Finally, another pseudorandom value can be formed and stored in the memory.

The benefit of shifting the value from the memory 2 four places to the left in the shifter 4 can be noticed when the sequence of pseudorandom values is used to produce an audible noise. Certain patterns in the audible noise can be noticed by the human ear if in the method the shifter 4 shifts the value only three bits to form the shifted value rather than four bits. These patterns are not noticed by the ear when the shifter 4 shifts the value four bits to the left. The method of listening to an audible noise produced from the sequence of pseudorandom values is an effective way to notice undesired patterns in the sequence of pseudorandom values. This technique is especially valuable when the sequence of pseudorandom values is used to produce noise for speech generation.

The above method can be done with four typical microcode instructions from the control unit 10. The first instruction is to load the accumulator with a location from the memory 2 with a shift of four bits to the left. The next step is a subtract of the value from the memory 2. This step subtracts the value in the memory 2 from the value in the accumulator 8. The third step is an "exclusive or" of one. One is a memory location in the memory 2 which holds the constant 1. The last instruction is to store the accumulator value into the memory 2.

FIG. 4 is a flow chart showing the method of the present invention. Note that the method steps of blocks 34b and 42a show the preferred embodiment and the method steps of blocks 34a and 42b show alternate embodiments. The steps between step 32 and step 46 can be repeated as many times as pseudorandom values are needed. Some of the method blocks in FIG. 4 refer to the apparatus of FIG. 1.

The pseudorandom value generator 12 shown in FIG. 1 can be part of a microcomputer or part of a digital signal processor. In the preferred embodiment, the method is used to produce noise for speech synthesis using a digital signal processor. FIG. 2 is a block diagram of an embodiment of a speech synthesis circuit using the pseudorandom value generator 12' of the present invention. Circuitry 16 loads the microcode instructions into the control unit 10 of FIG. 1 and also loads the seed value into the memory 2. This circuitry 16 of FIG. 2 may also convert a higher level programming code into the microcode instructions for the control unit 10. In the programming language "C", the pseudorandom value generator can be implemented with the operation:

$$\text{value} = ((\text{value} << 4) - \text{value}) \overset{"}{\wedge} 1;$$

The efficient pseudorandom value generator of the present invention can be used to generate noise for speech synthesis. In speech generation, certain sounds can be reproduced with filtered noise. These sounds are all the unvoiced sounds used in speaking. That is, all the sounds which do not require the use of the vocal cords. These sounds include "sh" sounds, "ch" sounds and "h" sounds.

In the embodiment of FIG. 2, the digital signal processor (DSP) 18 contains both the pseudorandom value generator 12' and the digital filter 14. The DSP 18 is programmed to do the digital filtering of the pseudorandom values. These digitally filtered values are sent to a sound generating circuitry 20'.

FIG. 3 is a block diagram of an alternate embodiment of a speech synthesis circuit using the pseudorandom value generator 12'' of the present invention. In this alternate embodiment, the digital pseudorandom value generator 12'' sends digital pseudorandom values to the digital-to-analog (D/A) converter 22 to produce an analog signal. This analog signal is sent to the analog filter 24 and a filtered signal is sent to the sound generating circuitry 20''.

Another possible use for the pseudorandom value generator is to produce digital dither noise. In digital sampling systems, dither noise is added to numeric samples before rounding to eliminate certain types of distortion.

Various details of the implementation and method are merely illustrative of the invention. It will be understood that various changes of details may be within the scope of the invention, which is to be limited only by the appended claims.

What is claimed is:

1. A method for generating pseudorandom values which have a number of bits in a circuit including a memory and an arithmetic logic unit, comprising the steps of:
   (a) placing a seed value in the memory;
   (b) forming a shifted value from the value in the memory;
   (c) subtracting in the arithmetic logic unit the value in the memory from the shifted value to form a subtracted value; and
   (d) complementing one or more bits of the subtracted value to form a new pseudorandom value.

2. The method of claim 1 further comprising storing the new value in the memory and repeating steps (b)–(d).

3. The method of claim 1, wherein the circuit further comprises a shifter wherein said shifted value forming step comprises moving the value from the memory to the shifter and thereafter shifting the value in the shifter.

4. The method of claim 1, wherein the subtracting step further comprises storing the subtracted value in an accumulator.

5. The method of claim 1, wherein said complementing step comprises complementing the least significant bit of the subtracted value.

6. The method of claim 5, wherein said complementing step comprises complementing the least significant bit of the subtracted value with an "exclusive or" operation in the arithmetic logic unit.

7. The method of claim 1, wherein said complementing step comprises complementing all the bits of the subtracted value.

8. A method for generating sounds comprising the steps of:
   producing a sequence of pseudorandom values, at least one value of said sequence being produced by placing a first value in a memory, forming a shifted value from the value in the memory, subtracting in an arithmetic logic unit the value in the memory from the shifted value to form a subtracted value, and complementing one or more bits of the subtracted value to form the at least one value of the sequence;
   filtering the sequence of pseudorandom values; and
   producing sounds from the filtered pseudorandom values.

9. The method of claim 8 wherein said pseudorandom values filtering step comprises digitally filtering the sequence of pseudorandom values.

10. The method of claim 8 wherein said pseudorandom values filtering step comprises producing an analog signal from said sequence of pseudorandom values and filtering said analog signal to produce a filtered analog signal and wherein said sound producing step comprises producing sounds from the filtered analog signal.

11. An apparatus for generating pseudorandom values which have a number of bits comprising:
   a memory;
   means for forming a shifted value from a value in the memory;
   means for subtracting the value in the memory from the shifted value to form a subtracted value and for complementing one or more bits of the subtracted value to form a new pseudorandom value.

12. The apparatus of claim 11, wherein said subtracting and complementing means includes an arithmetic logic unit.

13. The method of claim 8 wherein said shifted value forming step comprises shifting the value four bit locations left with logical zero's shifted into the four least significant bits.

14. An apparatus for generating pseudorandom values which have a number of bits comprising:
   a memory;
   a shifter adapted to form a shifted value from a value in the memory; and
   circuitry adapted to subtract the value in the memory from the shifted value to form a subtracted value and adapted to complement one or more bits of the subtracted value to form a new pseudorandom value.

15. The apparatus of claim 14, wherein said circuitry comprises an arithmetic logic unit.

16. The apparatus of claim 15, wherein said circuitry is adapted to complement the least significant bit of the subtracted value.

17. A method for generating pseudorandom values which have a number of bits in a circuit including a memory and an arithmetic logic unit, comprising the steps of:

(a) placing a seed value including a number of bit locations into the memory;
(b) forming a shifted value from the value in the memory by shifting the value three or more bit locations left with logical zeros shifted into the least significant bits;
(c) subtracting in the arithmetic logic unit the value in the memory from the shifted value to form a subtracted value; and
(d) complementing one or more bits of the subtracted value to form a new pseudorandom value.

18. The method of claim 17, wherein the shifting step comprises shifting the value four bit locations left with logical zero's shifted into the four least significant bits.

19. The method of claim 17, further comprising storing the new value in the memory and repeating steps (b)–(d).

20. An apparatus for generating pseudorandom values which have a number of bits comprising:
   a memory;
   a shifter adapted to form a shifted value from a value in the memory; and
   circuitry adapted to subtract the value in the memory from the shifted value to form a subtracted value and adapted to complement the least significant bit of the subtracted value to form a new pseudorandom value.

21. An apparatus for generating pseudorandom values which have a number of bits comprising:
   a memory;
   a shifter adapted to form a shifted value from a value in the memory; and
   circuitry adapted to subtract the value in the memory from the shifted value to form a subtracted value and adapted to complement all the bits of the subtracted value to form a new pseudorandom value.

* * * * *